United States Patent
Jung et al.

(10) Patent No.: US 11,661,174 B2
(45) Date of Patent: May 30, 2023

(54) RETRACTABLE PROPELLER APPARATUS OF AIR MOBILITY VEHICLE

(71) Applicants: HYUNDAI MOTOR COMPANY, Seoul (KR); KIA CORPORATION, Seoul (KR)

(72) Inventors: Sang Hyun Jung, Hwaseong-si (KR); Kyu Hoon Cho, Suwon-si (KR); Chung Sik Yim, Anyang-si (KR); Jae Young Choi, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 66 days.

(21) Appl. No.: 17/317,143

(22) Filed: May 11, 2021

(65) Prior Publication Data
US 2022/0144410 A1     May 12, 2022

(30) Foreign Application Priority Data
Nov. 6, 2020 (KR) .................. 10-2020-0147728

(51) Int. Cl.
*B64C 11/28* (2006.01)
(52) U.S. Cl.
CPC .................... *B64C 11/28* (2013.01)
(58) Field of Classification Search
CPC ........... B64C 3/56; B64C 11/46; B64C 11/28; B64C 27/30
See application file for complete search history.

(56) References Cited

U.S. PATENT DOCUMENTS

| 4,469,294 | A | * | 9/1984 | Clifton | B64C 39/12 244/12.3 |
|---|---|---|---|---|---|
| 4,828,203 | A | * | 5/1989 | Clifton | B64C 29/0033 244/12.3 |
| 6,561,456 | B1 | * | 5/2003 | Devine | B64C 29/0025 244/12.3 |
| 10,029,785 | B2 | * | 7/2018 | Niedzballa | B64D 27/02 |
| 10,336,443 | B2 | | 7/2019 | Louis et al. | |
| 10,894,599 | B1 | * | 1/2021 | Popiks | B64C 5/02 |
| 11,325,698 | B2 | * | 5/2022 | Millhouse | B64C 39/024 |
| 2019/0291860 | A1 | * | 9/2019 | Morgan | B64C 27/30 |
| 2020/0031478 | A1 | * | 1/2020 | Clark | B64C 3/32 |
| 2020/0079500 | A1 | | 3/2020 | Bivert et al. | |

FOREIGN PATENT DOCUMENTS

KR    10-2020-0104582     9/2020

\* cited by examiner

*Primary Examiner* — Joshua J Michener
*Assistant Examiner* — Cindi M Curry
(74) *Attorney, Agent, or Firm* — Lempia Summerfield Katz LLC (57) ABSTRACT

A retractable propeller apparatus of an air mobility vehicle has a structure enabling a propeller to be exposed or hidden depending on whether the air mobility vehicle is in a high-speed flight or a parking position. In particular, the retractable propeller apparatus includes: a base having a mount provided with a space; a propeller unit disposed on the mount and configured to generate a flow of air; a cover configured to close the space and be movable in the top-bottom direction with respect to the mount; and a lift unit disposed on the mount connected to the cover, and configured to move the cover. The cover selectively closes or opens the space based on an operation of the lift unit such that the propeller unit is operable.

13 Claims, 9 Drawing Sheets

RETRACTABLE PROPELLER APPARATUS OF AIR MOBILITY VEHICLE

CROSS REFERENCE TO RELATED APPLICATION

This application claims priority to and the benefit of Korean Patent Application No. 10-2020-0147728, filed on Nov. 6, 2020, the entire contents of which are incorporated herein by reference.

FIELD

The present disclosure generally relates to a retractable propeller apparatus of an air mobility vehicle and, more particularly, to a retractable propeller apparatus of an air mobility vehicle, the retractable propeller apparatus having a structure enabling propellers to be exposed or hidden depending on whether the air mobility vehicle is in a high-speed flight or a parking position.

BACKGROUND

The statements in this section merely provide background information related to the present disclosure and may not constitute prior art.

Recently, the development of air mobility vehicles usable for a variety of purposes, such as freight transportation or medical transportation, has been underway. Flying mobility vehicles are entering the stage of practical use, due to increased energy efficiencies and reliabilities thereof.

Such air mobility vehicles may fly by operating propellers, which also enable takeoff and landing. The takeoff and landing requires a greater amount of thrust and a greater number of revolutions of the propellers than during flight. In contrast, when an air mobility vehicle is in a flying state, the operation of some of the propellers used in vertical takeoff is no longer required. In particular, when the air mobility vehicle is in a high-speed flying state, the propellers generate air drag, thereby causing energy loss during the flight.

The foregoing is intended merely to aid in the understanding of the background of the present disclosure, and is not intended to mean that the present disclosure falls within the purview of the related art that is already known to those skilled in the art.

SUMMARY

The present disclosure proposes a retractable propeller apparatus of an air mobility vehicle having a structure enabling a propeller to be exposed or hidden depending on whether the air mobility vehicle is in a high-speed flight or a parking position. Accordingly, the propellers may be efficiently used in a variety of flying situations so as to improve energy efficiency, thereby increasing the ferry range of the air mobility vehicle.

In one aspect of the present disclosure, a retractable propeller apparatus of an air mobility vehicle includes: a base extending in a longitudinal direction, including a mount provided in a portion thereof, with a space being provided in the mount such that air flows therethrough; a propeller unit disposed on the mount to generate a flow of air in a top-bottom direction; a cover configured to close the space and be movable in the top-bottom direction with respect to the mount; and a lift unit disposed on the mount, connected to the cover, wherein the lift unit moves the cover depending on an operation thereof so that the cover closes the space or opens the space S so that the propeller unit is operable.

The mount may include an upper mount and a lower mount disposed on upper and lower portions of the space, respectively, such that the upper mount and the lower mount are spaced apart from each other, and the propeller unit may be disposed between and inside the upper mount and the lower mount.

The cover may include an upper cover configured to be movable via an upper lift unit outside the upper mount and a lower cover configured to be movable via a lower lift unit outside the lower mount.

The upper cover and the lower cover may be configured to be disassembled from each other in the top-bottom direction and from the base.

The mount may include a plurality of blocking surfaces and a plurality of through-holes repeatedly formed in a longitudinal direction thereof. The cover may include a plurality of closing surfaces and a plurality of through-holes repeatedly formed in a longitudinal direction thereof.

The mount may include a mounting portion provided on a longitudinal central portion thereof, with the propeller unit being disposed on the mounting portion. The blocking surfaces and the through-holes may be repeatedly formed on the mount in the longitudinal direction with respect to the mounting portion.

The blocking surfaces of the mount and the closing surfaces of the cover may have the same shapes as peripheral portions of the base.

The blocking surfaces of the mount may be matched to the through-holes of the cover, the through-holes of the mount may be matched to the closing surfaces of the cover, the blocking surfaces and the through-holes may have the same shapes, and the through-holes and the closing surfaces may have the same shapes.

The cover may have a plurality of support portions extending in the longitudinal direction to be in contact with side surfaces of the mount, thereby remaining in contact with the mount.

The support portions may be a pair of supports in contact with both side surfaces of the mount, and the mount may include reinforcing portions provided on portions thereof in contact with the support portions.

The lift unit may include: a first link unit including a plurality of link members connected to each other in a zigzag shape, and pivotably connected to the mount and the cover; a second link unit including a plurality of link members connected to each other in a zigzag shape, pivotably connected to the mount and the cover, at positions spaced apart from positions at which the first link unit is connected to the mount and the cover, so as to intersect the first link unit; and an actuator including a first end connected to a first link member of the plurality of first link members of the first link unit connected to the mount, and a second end connected to a second link member of the plurality of second link members of the second link unit connected to the cover, wherein a length of the actuator is variable in a longitudinal direction thereof.

The base may extend to connect separated wings of the air mobility vehicle.

The propeller unit may include a drive motor disposed on the mount and a plurality of propeller blades connected to the drive motor to rotate by receiving rotational power of the drive motor. The propeller blades may be a pair of propeller blades disposed to linearly extend from the drive motor.

The cover may be configured to cover the drive motor and the propeller blades.

In the retractable propeller apparatus of an air mobility vehicle having the above-described structure, propellers may be exposed or hidden depending on whether the air mobility vehicle is in a high-speed flight or a parking position. Accordingly, the propellers may be efficiently used in a variety of flying situations so as to improve energy efficiency, thereby increasing the ferry range of the air mobility vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a retractable propeller apparatus of an air mobility vehicle according to an exemplary form of the present disclosure will be described in detail with reference to the accompanying drawings.

Figure 1:
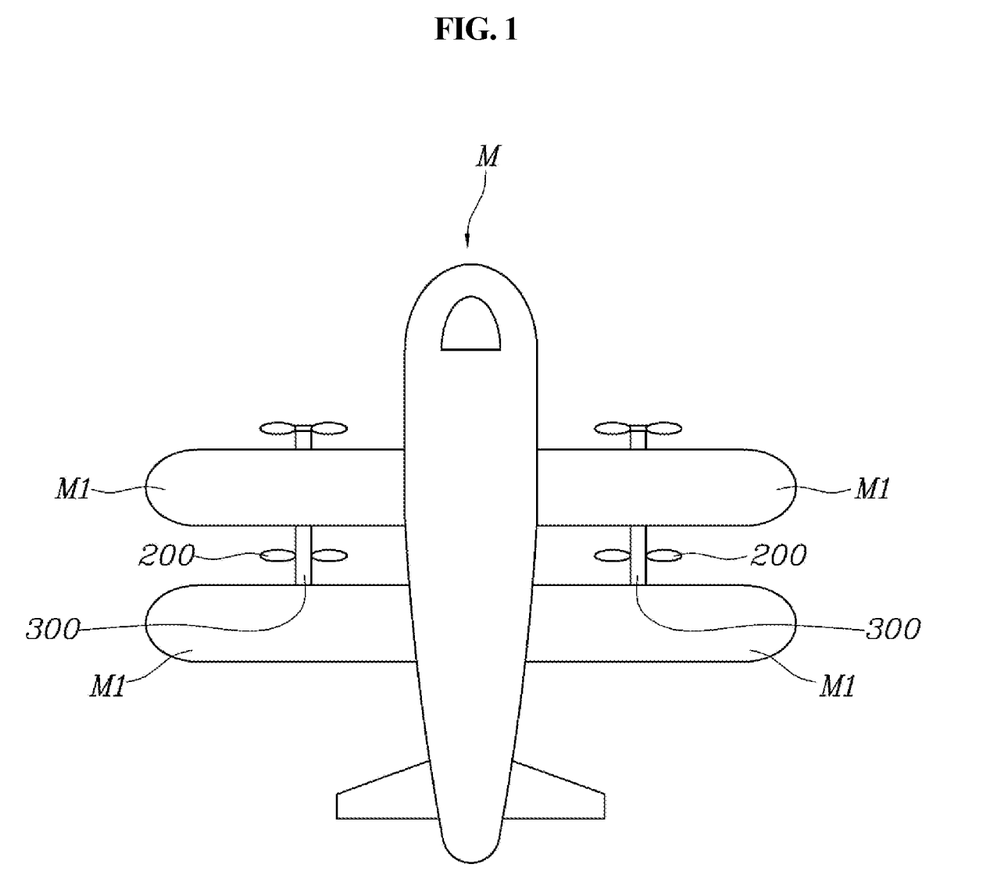
FIG. 1 is a view illustrating a retractable propeller apparatus of an air mobility vehicle according to an exemplary form of the present disclosure.
Figure 2:
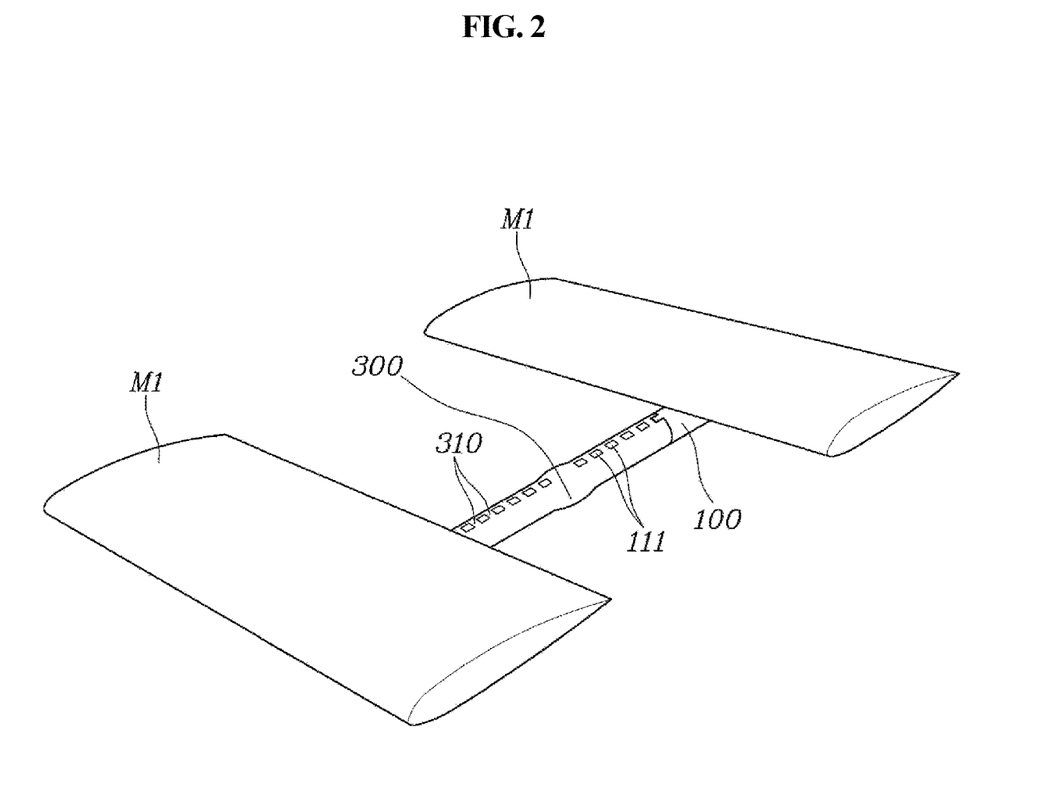
FIGS. 2 and 3 are views illustrating a retracted state of the retractable propeller apparatus of an air mobility vehicle illustrated in FIG. 1.
Figure 3:
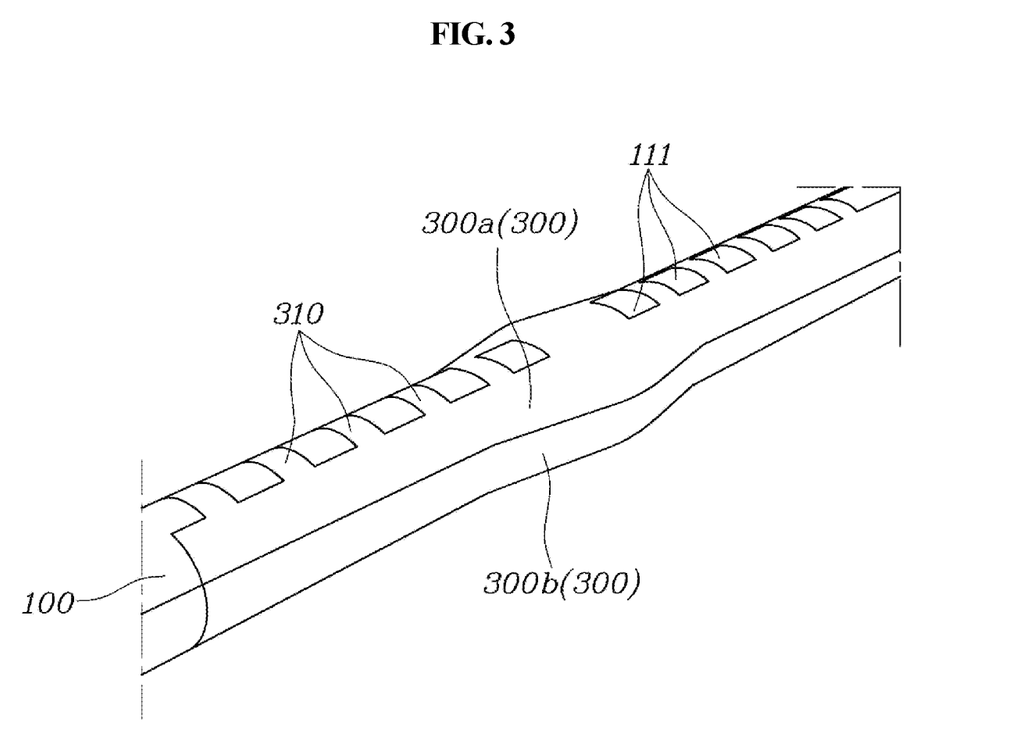
Figure 4:
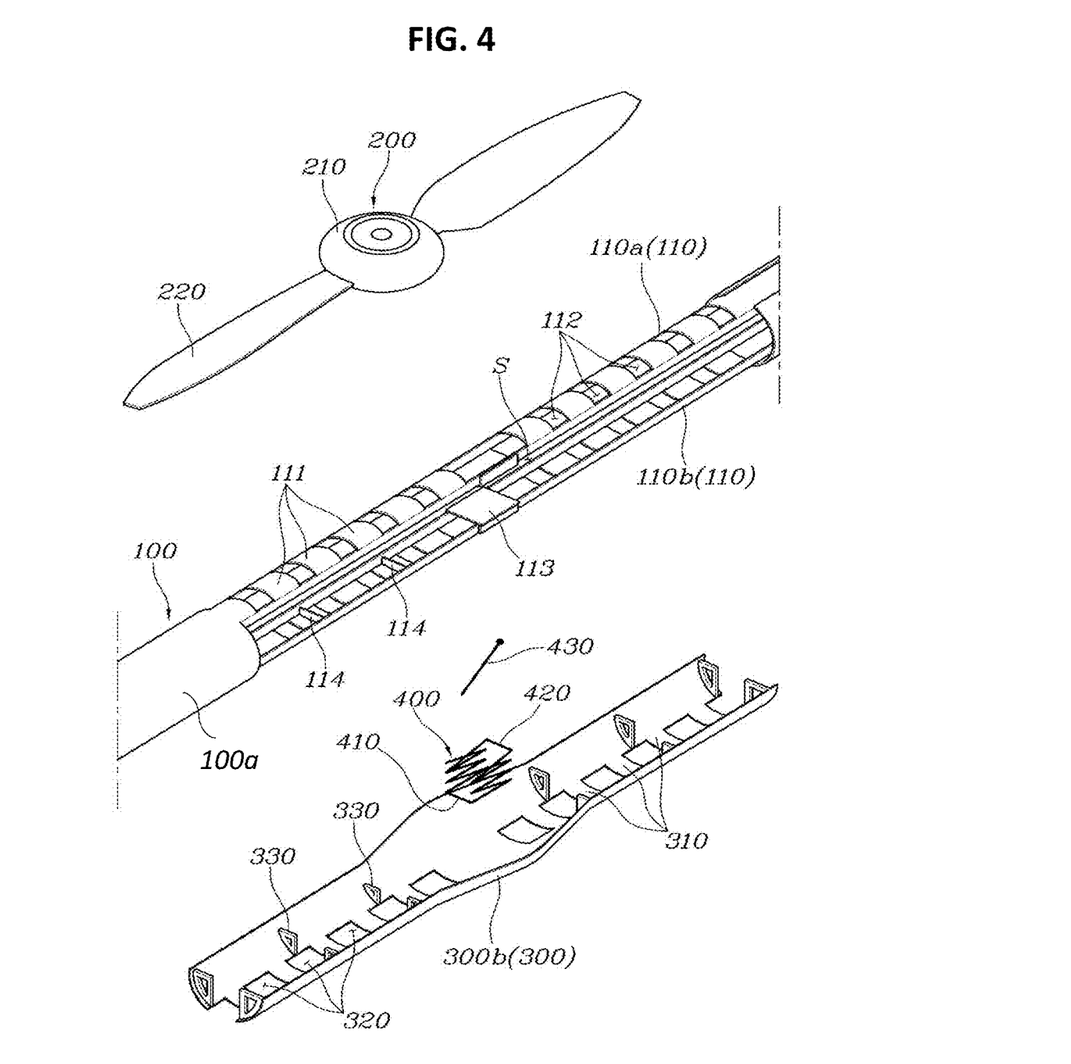
FIG. 4 is an assembly view illustrating the retractable propeller apparatus of an air mobility vehicle illustrated in FIG. 1.
Figure 5:
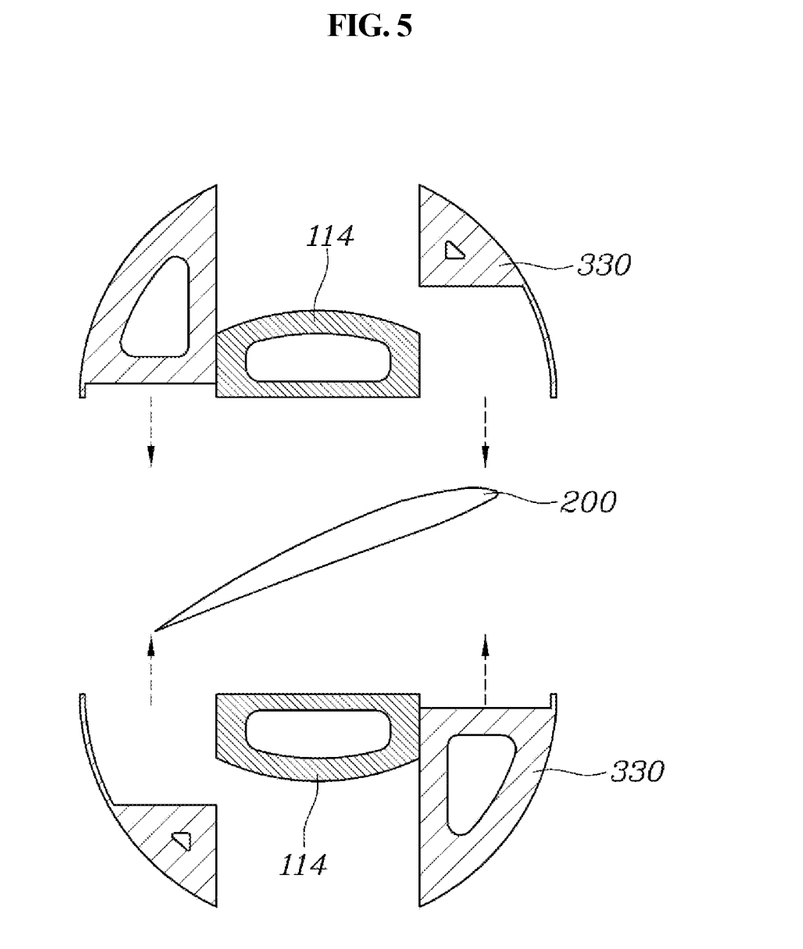
FIG. 5 is a cross-sectional view illustrating the retractable propeller apparatus of an air mobility vehicle illustrated in FIG. 1.
Figure 6:
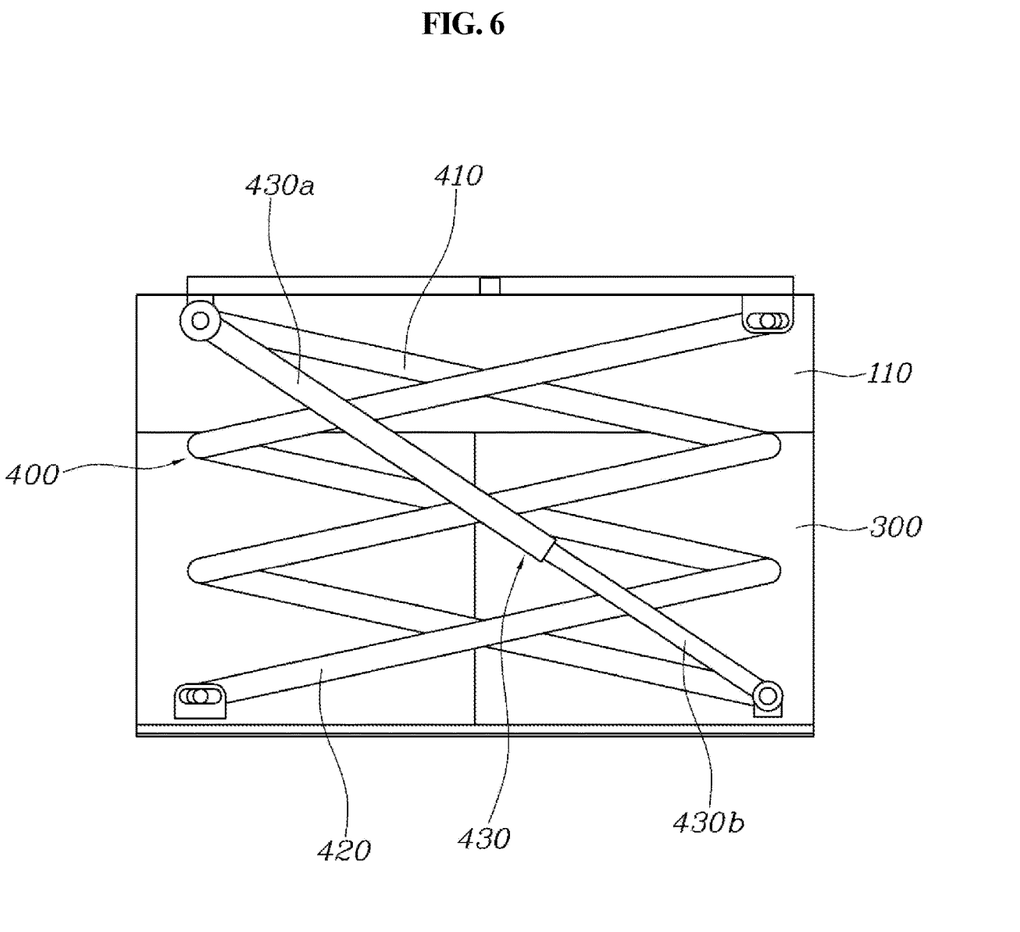
FIG. 6 is a view illustrating a lift unit of the retractable propeller apparatus of an air mobility vehicle illustrated in FIG. 1.
Figure 7:
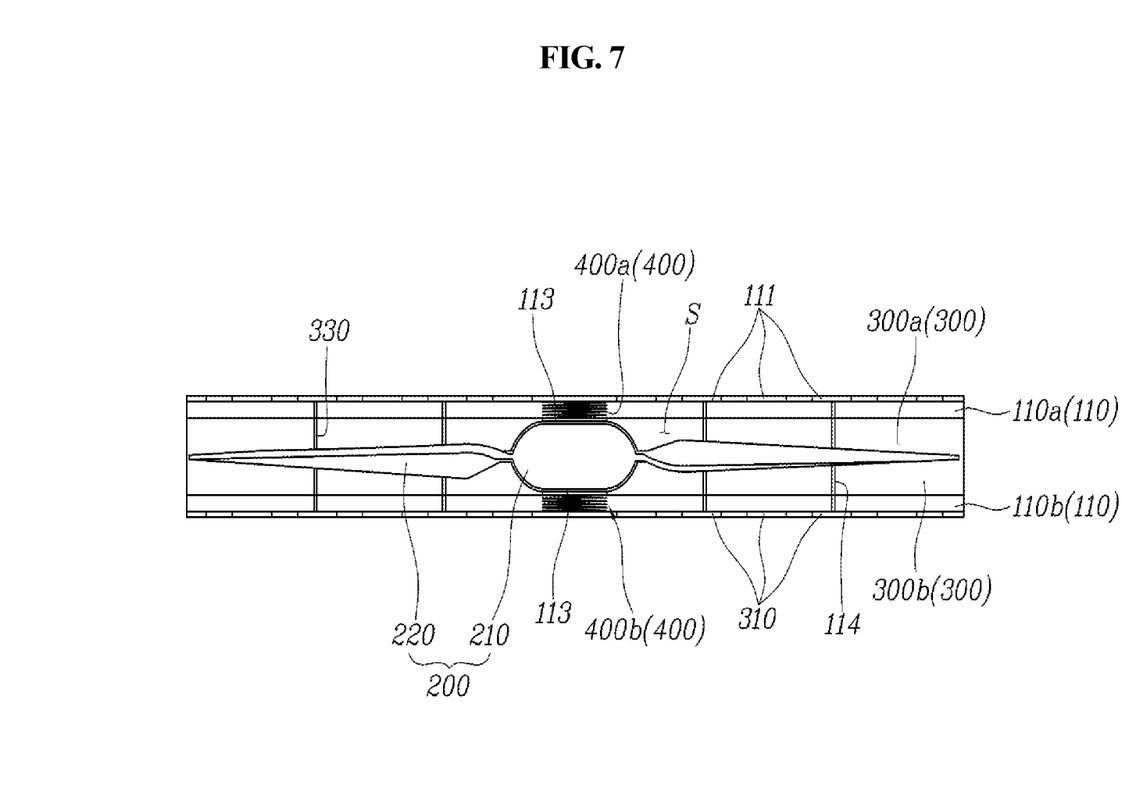
FIGS. 7 and 8 are views illustrating the operating states of the retractable propeller apparatus of an air mobility vehicle illustrated in FIG. 1.
Figure 8:
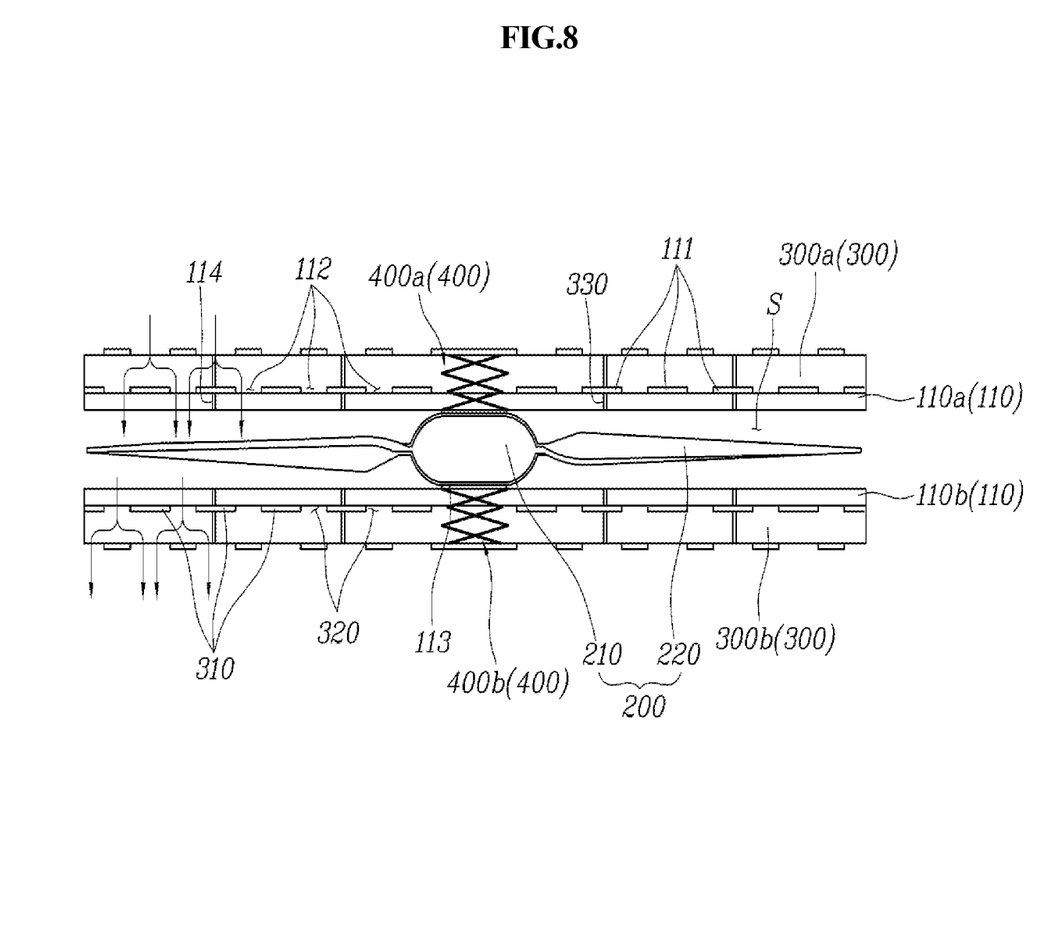
Figure 9:
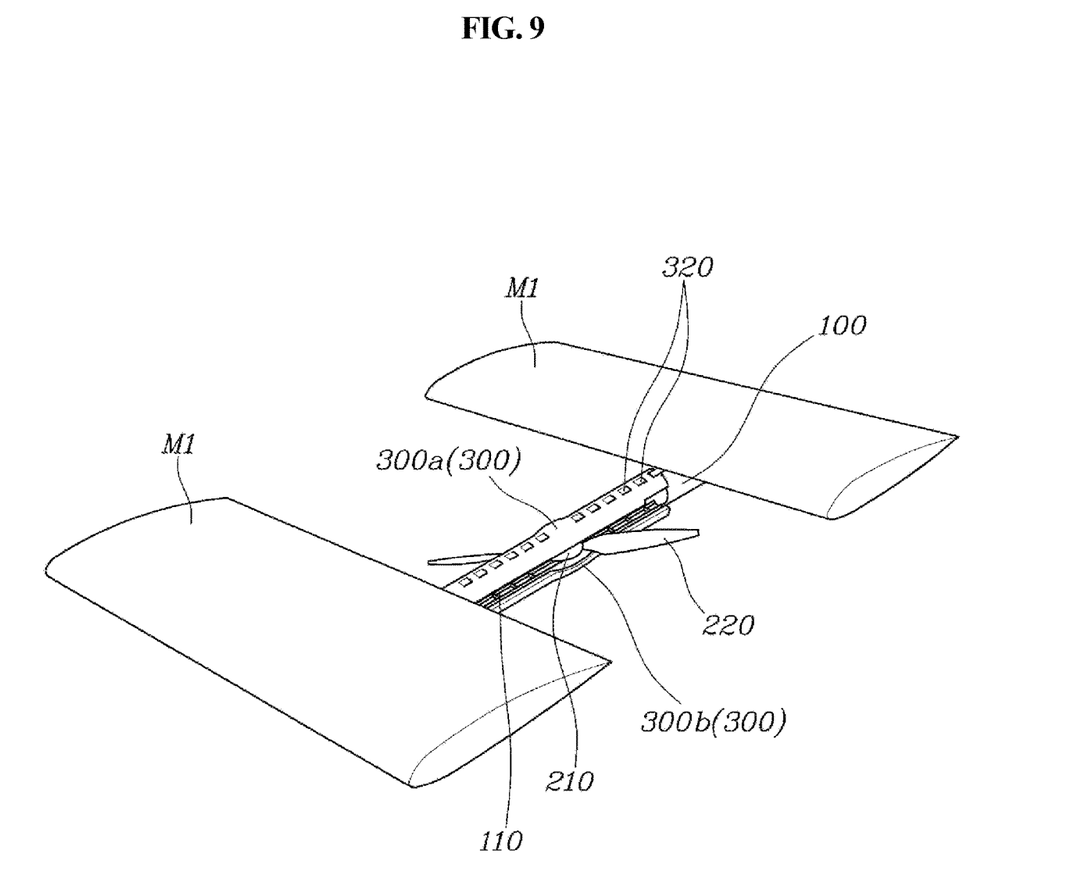
FIG. 9 is a view illustrating the deployed state of the retractable propeller apparatus of an air mobility vehicle illustrated in FIG. 1.

FIG. 1 is a view illustrating a retractable propeller apparatus of an air mobility vehicle according to one form of the present disclosure, FIGS. 2 and 3 are views illustrating a retracted state of the retractable propeller apparatus of an air mobility vehicle illustrated in FIG. 1, FIG. 4 is an assembly view illustrating the retractable propeller apparatus of an air mobility vehicle illustrated in FIG. 1, FIG. 5 is a cross-sectional view illustrating the retractable propeller apparatus of an air mobility vehicle illustrated in FIG. 1, FIG. 6 is a view illustrating a lift unit of the retractable propeller apparatus of an air mobility vehicle illustrated in FIG. 1, FIGS. 7 and 8 are views illustrating the operating states of the retractable propeller apparatus of an air mobility vehicle illustrated in FIG. 1, and FIG. 9 is a view illustrating the deployed state of the retractable propeller apparatus of an air mobility vehicle illustrated in FIG. 1.

As illustrated in FIGS. 1 to 4, the retractable propeller apparatus of an air mobility vehicle M includes: a base 100 extending in a longitudinal direction, and including a mount 110 provided in a portion thereof, with a space S through which air flows being provided in the mount 110; a propeller unit 200 disposed on the mount 110 to generate a flow of air in a top-bottom direction; a cover 300 configured to close (or seal) the space S and be movable in the top-bottom direction with respect to the mount 110; and a lift unit 400 disposed on the mount 110, connected to the cover 300, wherein the lift unit 400 moves the cover 300 depending on an operation thereof so that the cover 300 closes the space S or opens the space S so that the propeller unit 200 is operable. Here, each of the propeller unit 200 and the lift unit 400 may operate under the control of a controller (not shown).

The air mobility vehicle M according to the present disclosure is able to take off and land vertically, and includes wings generating thrust during high-speed flight and the bases 100 serving as support structures to connect the wings. Thus, the bases 100 may extend to connect the separate wings of the air mobility vehicle M. The mount 110 is provided on a portion of the base 100, and the propeller unit 200, the cover 300, and the lift unit 400 are disposed on the mount 110.

That is, the propeller unit 200 is disposed on the space S of the base 100 via the mount 110, and the cover 300 moved by the lift unit 400 selectively opens or closes the space S. The bases 100 are support structures connecting the plurality of wings. The propeller unit 200 generating a flow of air to the mount 110 is disposed on the base 100, such that thrust enabling the air mobility vehicle to fly vertically is generated by the operation of the propeller unit 200. The propeller unit 200 may include a drive motor 210 disposed on the mount 110 and a plurality of propeller blades 220 connected to the drive motor 210 to rotate by receiving rotational power of the drive motor 210. In one form of the present disclosure, the mount 110 extends in the longitudinal direction, and the propeller blades are provided as a pair of propeller blades disposed to linearly extend from the drive motor 210, such that the propeller blades may be retracted through the mount 110 and the cover 300.

Here, the position of the cover 300 disposed on the mount 110 of the base 100 to be movable in the top-bottom direction may be moved by the lift unit 400. In this manner, the cover 300 may close the space S so that the propeller unit 200 is hidden (i.e. retracted) or open the space S so that the propeller unit 200 is exposed (i.e. deployed) to operate. The cover 300 is configured to cover the drive motor 210 and the propeller blades 220, thereby forming a closing structure (or sealing structure) by which the drive motor 210 and the propeller blades 220 are protected when the cover 300 closes the space S. Thus, a portion of the cover 300, adjacent to the drive motor 210 having a relatively large size, may be formed to be wider. When the air mobility vehicle M flies at a high speed, the cover 300 closes the space S so that the propeller unit 200 is hidden. Accordingly, increases in air drag caused by the propeller blades 220 may be prevented, thereby enabling the air mobility vehicle M to efficiently fly. In addition, during the vertical flight of the air mobility vehicle M, the cover 300 opens the space S so that the propeller unit 200 is exposed. Accordingly, the propeller unit 200 may be driven, thereby enabling the air mobility vehicle M to take off and land.

Hereinafter, the exemplary forms of present disclosure will be described in more detail. As illustrated in FIG. 4, the mount 110 includes an upper mount 110a and a lower mount 110b disposed on the upper and lower portions of the space S, respectively, such that the upper mount 110a and the lower mount 110b are spaced apart from each other. The propeller unit 200 may be disposed between and inside the upper mount 110a and the lower mount 110b.

That is, since the mount 110 includes the upper mount 110a and the lower mount 110b spaced apart from each other in the top-bottom direction, the strength of the base 100 may be obtained, thereby preventing decreases in the strength due to the provision of the space S. In particular, since the propeller unit 200 is provided between the upper mount 110a and the lower mount 110b and fixed disposed by the upper mount 110a and the lower mount 110b, the stability of the provision of the propeller unit 200 may be provided.

As illustrated in FIG. 3, the cover 300 may include an upper cover 300a and a lower cover 300b. The upper cover 300a is provided to be movable via an upper lift unit 400a outside the upper mount 110a. The lower cover 300b is provided to be movable via a lower lift unit 400b outside the lower mount 110b.

In this manner, the cover 300 includes the upper cover 300a and the lower cover 300b, while the lift unit 400 includes the upper lift unit 400a and the lower lift unit 400b. That is, the upper cover 300a is disposed on the upper mount 110a such that the upper cover 300a is movable via the upper lift unit 400a. The lower cover 300b is disposed on the lower mount 110b such that the lower cover 300b is movable via the lower lift unit 400b. Accordingly, the upper cover 300a and the lower cover 300b may move in the top-bottom direction, thereby opening and closing the space S of the base 100.

Here, the upper cover 300a and the lower cover 300b may be configured to be disassembled from each other in the top-bottom direction from the base 100. Thus, when the upper cover 300a and the lower cover 300b close the space S, the upper cover 300a and the lower cover 300b are coplanar with the base 100, thereby reducing air drag during flight. That is, as illustrated in FIG. 3, when the base 100 is circular, each of the upper cover 300a and the lower cover 300b is semicircular. When the upper cover 300a and the lower cover 300b close the space S, the upper cover 300a and the lower cover 300b are circular like the base 100, such that the outer surfaces thereof are smoothly aligned with that of the base 100.

The mount 110 has a plurality of blocking surfaces 111 and a plurality of through-holes 112 repeatedly formed in the longitudinal direction thereof. The cover 300 may have a plurality of closing surfaces 310 and a plurality of through-holes 320 repeatedly formed in the longitudinal direction thereof.

As illustrated in FIGS. 3 and 4, the mount 110 has the through-holes 112 perforated therein and spaced apart from each other in the longitudinal direction, such that air may flow therethrough in the top-bottom direction. The blocking surfaces 111 are provided to alternate with the through-holes 112. The cover 300 has the through-holes 320 perforated therein and spaced apart from each other in the longitudinal direction, such that air may flow therethrough in the top-bottom direction. The closing surfaces 310 are provided to alternate with the through-holes 320. When the cover 300 is opened, passages through which air may flow in the top-bottom direction are formed by the through-holes 320 of the cover 300 and the through-holes 112 of the mount 110, such that air may pass through the cover 300 and the mount 110 during the operation of the propeller unit 200. Accordingly, the operation of the propeller unit 200 may provide an amount of flowing air, thereby improving flying performance obtained by the propeller unit 200.

Here, a mounting portion 113 on which the propeller unit 200 is disposed is provided in the longitudinal central portion of the mount 110. The blocking surfaces 111 and the through-holes 112 are repeatedly formed in the longitudinal direction with respect to the mounting portion 113.

In this manner, the mounting portion 113 is provided in the longitudinal central portion of the mount 110, such that propeller unit 200 is firmly disposed. The mounting portion 113 may be configured to match the shape of the upper portion or the lower portion of the propeller unit 200 such that the propeller unit 200 is firmly seated. In addition, since the mounting portion 113 is provided in the longitudinal central portion of the mount 110, load resulting from the provision of the propeller unit 200 is uniformly distributed, and a space in which the propeller unit 200 may operate is easily obtained. Since the blocking surfaces 111 and the through-holes 112 are repeatedly disposed on both sides of the mounting portion 113, the propeller unit 200 may be firmly disposed, and a flow of air produced by the propeller unit 200 may flow through the through-holes 112.

In addition, the blocking surfaces 111 of the mount 110 may be matched to the through-holes 320 of the cover 300. The through-holes 112 of the mount 110 may be matched to the closing surfaces 310 of the cover 300. The blocking surfaces 111 and the through-holes 320 may have the same shapes, and the through-holes 112 and the closing surfaces 310 may have the same shapes.

That is, the blocking surfaces 111 of the mount 110 are matched to the through-holes 320 of the cover 300 in the top-bottom direction, and the through-holes 112 of the mount 110 are matched to the closing surfaces 310 of the cover 300 in the top-bottom direction. Thus, when the cover 300 is moved toward the mount 110 to close the space S, the blocking surfaces 111 of the mount 110 are matched to the through-holes 320 of the cover 300, thereby closing the through-holes 320. Even in the case that the through-holes 320 are formed in the cover 300 as above, the blocking surfaces 111 matched to the through-holes 320 may close the through-holes 320, thereby forming a shape which closes the space S and in which the outer surface of the cover 300 smoothly extends. In addition, since the closing surfaces 310 of the cover 300 are matched to the through-holes 112 of the mount 110, a structure closing the cover 300 and the mount 110 may be provided.

That is, when the cover 300 is opened, air flows through the through-holes 320 of the cover 300 and the through-holes 112 of the mount 110 in the top-bottom direction. When the cover 300 is closed, the outer surface smoothly extends due to the closing surfaces 310 of the cover 300 and the blocking surfaces 111 of the mount 110.

In this regard, the blocking surfaces 111 and the through-holes 320 may have the same shapes, and the through-holes 112 and the closing surfaces 310 may have the same shapes. The blocking surfaces 111 of the mount 110 and the closing surfaces 310 of the cover 300 may have the same shapes as the peripheral portions 100a of the base 100. Accordingly, when the cover 300 closes the space S, the cover 300 and the mount 110 may close the space S. Since the blocking surfaces 111 of the mount 110 and the closing surfaces 310 of the cover 300 have the same shapes, the outer surfaces may have a shape smoothly aligned with the base 100.

In addition, as illustrated in FIGS. 4 and 5, the cover 300 may have a plurality of support portions 330 extending in the longitudinal direction to be in contact with the side surfaces of the mount 110, thereby remaining in contact with the mount 110. Since the support portions 330 of the cover 300 are in contact with the mount 110 in this manner, the cover 300 may be supported to the mount 110 via the support portions 330 such that the position thereof may be reliably maintained. That is, when the cover 300 is moved to an opening position of the mount 110, wind power produced by the flight of the air mobility vehicle M may be applied to the cover 300, thereby vibrating the cover 300. In contrast, according to the present disclosure, the contact of the cover 300 with the mount 110 via the support portions 330 is maintained, so that vibration is reduced and a stable support state is maintained. In addition, when the cover 300 is moved by the lift unit 400, the movement is guided by the support portions 330, so that a reliable moving operation may be performed.

A pair of the support portions 330 is provided on the inner peripheral portions of the cover 300 to be in contact with both side surfaces of the mount 110. In addition, the number and thickness of the support portions 330 may be adjusted depending on the reliability of movement and the support performance of the cover 300.

The mount 110 may have reinforcing portions 114 formed on portions thereof in contact with the support portions 330. A plurality of reinforcing portions 114 may be provided in the longitudinal direction of the mount 110 and extend in the same direction as the blocking surfaces 111, thereby obtaining the strength of the mount 110. In addition, the reinforcing portions 114 are formed in portions of the mount 110, with which the support portions 330 are in contact, thereby increasing the strength of weak portions vulnerable to the contact of the support portions 330.

The lift unit 400 may include a first link 410, a second link 420, and an actuator 430. The first link unit 410 includes a plurality of link members connected in a zigzag shape, and is pivotably connected to the mount 110 and the cover 300. The second link unit 420 includes a plurality of link members connected in a zigzag shape, is pivotably connected to the mount 110 and the cover 300 at positions spaced apart from positions at which the first link unit 410 is connected to the mount 110 and the cover 300, so as to intersect the first link unit 410. The actuator 430 is configured such that one end thereof is connected to the link member of the first link unit 410 connected to the mount 110, the other end thereof is connected to the link member of the second link unit 420 connected to the cover 300, and the length thereof is variable in the longitudinal direction thereof.

As illustrated in FIG. 6, the lift unit 400 includes the first link unit 410 and the second link unit 420 respectively comprised of a plurality of link members, with the actuator 430 being connected to the first link unit 410 and the second link unit 420. That is, the first link unit 410 is configured such that the plurality of link members thereof are pivotably connected in zigzag shapes, thereby forming hinge structures, and the link members on both ends thereof are pivotably connected to the mount 110 and the cover 300, respectively. In addition, the second link unit 420 is configured such that the plurality of link members thereof are pivotably connected in zigzag shapes, thereby forming hinge structures, and the link members on both ends thereof are pivotably connected to the mount 110 and the cover 300, respectively, at positions different from those of the first link unit 410. Thus, the first link unit 410 and the second link unit 420 form a structure supporting the cover 300 with respect to the mount 110. The connection structure of the first link unit 410 and the second link unit 420 obtains strength. The lengths of the first link unit 410 and the second link unit 420 are adjustable in the top-bottom direction by the actuator 430 connected thereto. The actuator 430 may be a linear actuator able to change the length thereof by a linear motion. Thus, a cylinder 430a of the actuator 430 is connected to the link member of the first link unit 410 connected to the mount 110, and a piston 430b of the actuator 430 is connected to the link member of the second link unit 420 connected to the cover 300. When the length of the actuator 430 is varied, the first link unit 410 and the second link unit 420 may be spread or folded (or retracted) in the top-bottom direction, thereby lifting or lowering the cover 300. The lift unit 400 may lift or lower the cover 300 by the operation of the actuator 430 alone. The operation of lifting or lowering the cover 300 may be realized using a variety of manners, such as a rack and pinion structure or a gear structure.

The operation of lifting or lowering the cover 300 according to one form of the present disclosure will be described as follows.

When the cover 300 closes the space S, the cover 300 is moved toward the mount 110 to close the space S so that the propeller unit 200 is also hidden and the cover 300 is smoothly aligned with the base 100, as illustrated in FIGS. 2 and 7. Accordingly, during high-speed flight, increases in air drag caused by the propeller blades 220 may be prevented, thereby enabling the air mobility vehicle M to efficiently fly.

In addition, when the cover 300 opens the space S, the operation of lifting or lowering the cover 300 is enabled by the operation of the lift unit 400, as illustrated in FIGS. 8 and 9. As described above, when the cover 300 opens the space S, the propeller unit 200 is exposed and a space in which the propeller blades 220 of the propeller unit 200 may rotate is obtained, so that flight may be enabled by the rotation of the propeller blades 220.

Furthermore, in the operation of opening the cover 300, the passages through which air may flow in the top-bottom direction are formed by the through-holes 320 of the cover 300 and the through-holes 112 of the mount 110, such that air may pass through the cover 300 and the mount 110 during the operation of the propeller unit 200. Accordingly, the operation of the propeller unit 200 may provide an amount of flowing air, thereby improving flying performance obtained by the propeller unit 200. This may be used during vertical flight of the air mobility vehicle M. The air mobility vehicle M may take off or land due to the operation of the propeller unit 200.

As set forth above, the retractable propeller apparatus of the air mobility vehicle M has the above-described structure enabling the propellers to be exposed or hidden depending on whether the air mobility vehicle is in a high-speed flight or a parking position. Accordingly, the propellers may be efficiently used in a variety of flying situations so as to improve energy efficiency, thereby increasing the ferry range of the air mobility vehicle.

Retractable propeller apparatus of an air mobility vehicle, the retractable propeller apparatus having a structure Although the exemplary forms of the present disclosure have been described for illustrative purposes, those skilled in the art will appreciate that various modifications, additions and substitutions are possible, without departing from the scope and spirit of the present disclosure.

What is claimed is:

1. A retractable propeller apparatus of an air mobility vehicle, the retractable propeller apparatus comprising:
a base extending in a longitudinal direction, comprising a mount provided in a portion thereof, wherein the mount is provided with a space through which an air flows;
a propeller unit disposed on the mount and configured to generate a flow of air in a top-bottom direction;
a cover configured to close the space and be movable in the top-bottom direction with respect to the mount; and
a lift unit disposed on the mount connected to the cover, and configured to move the cover,
wherein the cover is configured to selectively close the space or open the space based on an operation of the lift unit such that the propeller unit is operable,
wherein the propeller unit comprises:
a drive motor disposed on the mount, and
a plurality of propeller blades connected to the drive motor and configured to rotate by receiving rotational power of the drive motor, and
wherein the plurality of propeller blades comprises a pair of propeller blades disposed to linearly extend from the drive motor.

2. The retractable propeller apparatus of claim 1, wherein:
the mount comprises an upper mount and a lower mount disposed on upper and lower portions of the space, respectively, such that the upper mount and the lower mount are spaced apart from each other, and
the propeller unit is disposed between and inside the upper mount and the lower mount.

3. The retractable propeller apparatus of claim 2, wherein the cover comprises an upper cover configured to be movable via an upper lift unit outside the upper mount and a lower cover configured to be movable via a lower lift unit outside the lower mount.

4. The retractable propeller apparatus of claim 3, wherein the upper cover and the lower cover are configured to be disassembled from each other in the top-bottom direction and from the base.

5. The retractable propeller apparatus of claim 1, wherein:
the mount comprises a plurality of blocking surfaces and a plurality of through-holes repeatedly formed in a longitudinal direction thereof, and
the cover comprises a plurality of closing surfaces and a plurality of through-holes repeatedly formed in a longitudinal direction thereof.

6. The retractable propeller apparatus of claim 5, wherein:
the mount comprises a mounting portion provided on a longitudinal central portion thereof, with the propeller unit being disposed on the mounting portion,
the plurality of blocking surfaces and the plurality of through-holes are repeatedly formed on the mount in the longitudinal direction with respect to the mounting portion.

7. The retractable propeller apparatus of claim 5, wherein the plurality of blocking surfaces of the mount and the plurality of closing surfaces of the cover have the same curvature as peripheral portions of the base.

8. The retractable propeller apparatus of claim 5, wherein:
the plurality of blocking surfaces of the mount are matched to the plurality of through-holes of the cover,
the plurality of through-holes of the mount are matched to the plurality of closing surfaces of the cover,
the plurality of blocking surfaces and the plurality of through-holes have the same shapes, and
the plurality of through-holes and the plurality of closing surfaces have the same shapes.

9. The retractable propeller apparatus of claim 1, wherein the cover has a plurality of support portions extending in the longitudinal direction to be in contact with side surfaces of the mount, thereby remaining in contact with the mount.

10. The retractable propeller apparatus of claim 9, wherein:
the plurality of support portions comprise a pair of supports in contact with side surfaces of the mount, and
the mount comprises reinforcing portions provided on portions of the mount in contact with the plurality of support portions.

11. The retractable propeller apparatus of claim 1, wherein the lift unit comprises:
a first link unit comprising a plurality of first link members connected to each other in a zigzag shape, and pivotably connected to the mount and the cover;
a second link unit comprising a plurality of second link members connected to each other in a zigzag shape, pivotably connected to the mount and the cover, at positions spaced apart from positions at which the first link unit is connected to the mount and the cover, so as to intersect the first link unit; and
an actuator including:
a first end connected to a first link member of the plurality of first link members of the first link unit connected to the mount, and
a second end connected to a second link member of the plurality of second link members of the second link unit connected to the cover, wherein a length of the actuator is variable in a longitudinal direction thereof.

12. The retractable propeller apparatus of claim 1, wherein the base extends to connect separated wings of the air mobility vehicle.

13. The retractable propeller apparatus of claim 1, wherein the cover is configured to cover the drive motor and the plurality of propeller blades.

* * * * *